United States Patent
Brault et al.

(10) Patent No.: US 9,803,743 B2
(45) Date of Patent: Oct. 31, 2017

(54) ROTATING ASSEMBLY COMPRISING A TRANSMISSION MEMBER AND AN OIL DISTRIBUTION SYSTEM

(71) Applicant: SNECMA, Paris (FR)

(72) Inventors: Michel Gilbert Roland Brault, Moissy-Cramayel (FR); Kévin Lemarchand, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 14/914,346

(22) PCT Filed: Sep. 4, 2014

(86) PCT No.: PCT/FR2014/052183
§ 371 (c)(1),
(2) Date: Feb. 25, 2016

(87) PCT Pub. No.: WO2015/033066
PCT Pub. Date: Mar. 12, 2015

(65) Prior Publication Data
US 2016/0215871 A1    Jul. 28, 2016

(30) Foreign Application Priority Data

Sep. 6, 2013  (FR) ...................................... 13 58581

(51) Int. Cl.
*F16H 57/04*    (2010.01)
(52) U.S. Cl.
CPC ....... *F16H 57/0479* (2013.01); *F16H 57/042* (2013.01)
(58) Field of Classification Search
None
See application file for complete search history.

(56) References Cited

U.S. PATENT DOCUMENTS

| 4,271,928 A | 6/1981 | Northern |
| 6,223,616 B1 | 5/2001 | Sheridan |

(Continued)

FOREIGN PATENT DOCUMENTS

| DE | 102013215882 A1 * | 2/2015 | ......... F16H 57/0427 |
| FR | 2 431 028 A1 | 2/1980 | |

(Continued)

OTHER PUBLICATIONS

English Translation of Search Report mailed on Nov. 24, 2014, in corresponding International PCT Application No. PCT/FR2014/052183, filed on Sep. 4, 2014 (2 pages).

*Primary Examiner* — Dirk Wright
(74) *Attorney, Agent, or Firm* — Bookoff McAndrews, PLLC

(57) ABSTRACT

A rotary assembly comprising a transmission member and an oil distribution system enabling oil to be supplied to the transmission member in order to lubricate it. According to the invention, the oil distribution system comprises at least one oil transfer chamber provided with at least one feed orifice configured to receive oil from outside the rotary assembly; the transmission member includes at least one rotary portion provided with at least one oil reception chamber; at least one link duct provides fluid flow connection between the oil transfer chamber and the oil reception chamber; the oil distribution system is driven by said rotary portion of the transmission member to rotate together with it; and the rotary assembly is configured in such a manner as to accommodate a given amount of axial and/or radial relative movement between said rotary portion of the transmission member and the oil distribution system.

12 Claims, 4 Drawing Sheets

(56) References Cited

U.S. PATENT DOCUMENTS

| | | | |
|---|---|---|---|
| 7,537,537 B2 * | 5/2009 | Smet | F16H 57/0479 |
| | | | 184/6.12 |
| 7,704,178 B2 * | 4/2010 | Sheridan | F01D 25/18 |
| | | | 475/159 |
| 8,172,716 B2 * | 5/2012 | McCune | F02C 7/06 |
| | | | 475/331 |
| 8,777,793 B2 * | 7/2014 | Sheridan | F01D 25/16 |
| | | | 475/160 |
| 9,410,608 B2 * | 8/2016 | McCune | F16H 57/028 |
| 2013/0225353 A1 | 8/2013 | Gallet et al. | |

FOREIGN PATENT DOCUMENTS

| | | | | |
|---|---|---|---|---|
| JP | 2014181793 A | * | 9/2014 | F16H 57/043 |
| JP | 2015102161 A | * | 6/2015 | F16H 57/082 |

* cited by examiner

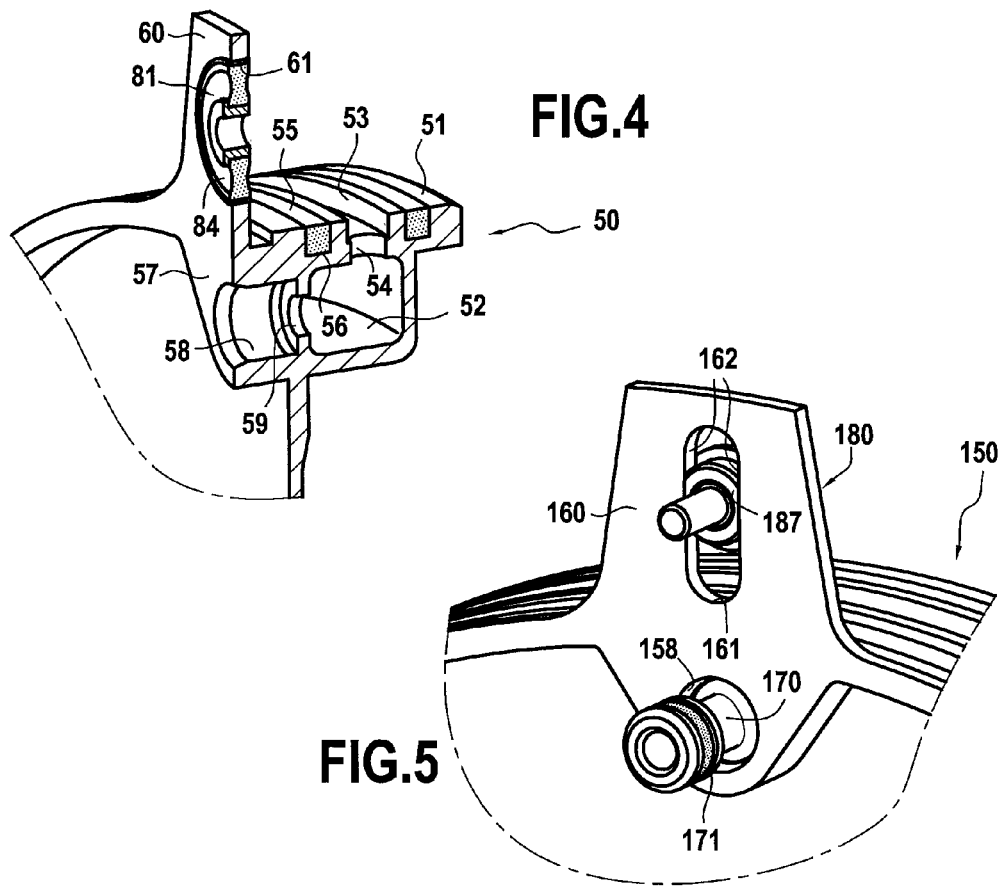
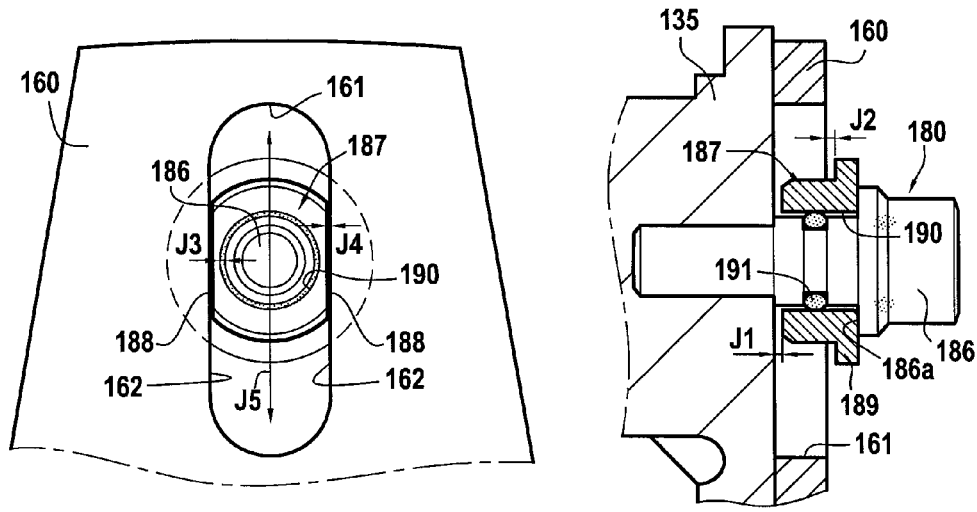

ROTATING ASSEMBLY COMPRISING A TRANSMISSION MEMBER AND AN OIL DISTRIBUTION SYSTEM

CROSS-REFERENCE TO RELATED APPLICATIONS

This application is the U.S. national phase entry under 35 U.S.C. §371 of International PCT Application No. PCT/FR2014/052183, filed on Sep. 4, 2014, which claims priority to French Patent Application No. FR 1358581, filed on Sep. 6, 2013, the entireties of each of which are incorporated by reference herein.

FIELD OF THE INVENTION

The present description relates to a rotary assembly comprising a transmission member and an oil distribution system serving to supply oil to the transmission member in order to lubricate it.

Such a rotary assembly may be used in particular in the field of aviation, within airplane turbojets or within helicopter turboshaft engines, to mention only these examples.

STATE OF THE PRIOR ART

The turbojets that are conventionally to be found these days in the field of civil aviation are bypass turbojets with two spools. Nevertheless, because of ever-increasing constraints on operating costs, closely associated with the cost of fuel, which nowadays is very high, new turbojet projects have been proposed that benefit from lower specific consumption.

One promising option consists in fitting a turbojet with a speed-reducing gearbox interposed between the low pressure compressor and the fan: in this way, it is possible to increase the speed of rotation of the low pressure spool, thereby increasing the overall efficiency of the turbojet, while reducing the speed of the fan, thereby reducing aerodynamic disturbances at the blade tips and thus contributing to reducing the noise generated by the fan.

A turbojet with a gearbox thus presents important qualities, but at present certain difficulties still remain that need to be overcome before launching industrial production.

In particular, the gearbox needs to be lubricated and cooled in order to ensure that it operates correctly without being damaged. In a conventional gearbox, these functions are traditionally provided by a flow of oil fed centrifugally; nevertheless, it has been found that the pressure of the oil is not sufficient in such configurations of gearbox turbojets to ensure that centrifugal feeding is effective.

Another solution that has been proposed consists in transferring oil between the casing and the gearbox via an oil transfer bearing mounted on the gearbox. Nevertheless, that solution is not satisfactory either since the operation of the oil transfer bearing is greatly disturbed by the erratic movements and changes in axis of the gearbox caused by the large amount of vibration to which it is subjected: in particular, it is found that the oil transfer bearing is the seat of premature wear thereby affecting the feed of oil and thus the lifetime of the gearbox.

There thus exists a real need for a rotary assembly comprising a transmission member and an oil distribution system and that is free, at least in part, of the drawbacks inherent to the above-specified known configurations.

SUMMARY OF THE INVENTION

The present description relates to a rotary assembly comprising a transmission member and an oil distribution system, wherein the oil distribution system comprises at least one oil transfer chamber provided with at least one feed orifice configured to receive oil from outside the rotary assembly; the transmission member includes at least one rotary portion provided with at least one oil reception chamber; at least one link duct provides fluid flow connection between the oil transfer chamber and the oil reception chamber; the oil distribution system is driven by said rotary portion of the transmission member to rotate together with it; and the rotary assembly is configured in such a manner as to accommodate a given amount of axial and/or radial relative movement between said rotary portion of the transmission member and the oil distribution system.

In the present description, the term the oil distribution system is driven by said rotary portion of the transmission member to rotate together with it is used typically to mean that the oil distribution system rotates at substantially the same speed, and in any event with the same speed on average as the rotary portion of the transmission member with a phase shift that remains substantially zero, and that is in any event zero on average, such that any given point of the oil distribution system is always substantially facing the same zone of the rotary portion of the transmission member. This definition thus accommodates small transient differences in speed or small transient phase shifts due to parasitic vibration, or in the event of the rotary portion of the transmission member accelerating or decelerating, for example.

In addition, the term "given amount of axial and/or radial relative movement" is used to mean a relative movement of amplitude that exceeds that which results from ordinary assembly clearances: the idea is to provide freedom of movement that is greater than such conventional clearances.

Under such circumstances, the orifice of the oil reception chamber is always substantially facing the same orifice of the oil transfer chamber, thereby enabling the link duct to be put into place and thus enabling oil to be distributed from the oil distribution system to the rotary portion of the transmission member.

Furthermore, by means of this configuration, and excluding the rotary drive, movements of the transmission member and of the oil distribution system are decoupled, at least over a given amplitude range: the rotary portion of the transmission member can thus be subjected to certain erratic movements or changes of axis caused by the vibration of the transmission member, with propagation thereof to the oil distribution system being reduced or even completely avoided. The position and the alignment of the oil distribution system relative to outside the rotary assembly is therefore disturbed little or not at all during its rotation, thereby ensuring that the oil distribution system is fed directly from the outside while reducing leaks of oil at this interface.

In particular, this limits any risk of the erratic movements of the transmission member causing the oil distribution system to come into collision with or to rub against certain members that are external to the rotary assembly, e.g. a casing: under such circumstances, the efficiency of the rotary assembly is preserved and it suffers little wear, thereby prolonging its lifetime.

In the present description, the terms "axial", "radial", "tangential", "inner", and "outer", and their derivatives are defined relative to the main axis of the rotary assembly.

In certain embodiments, the oil distribution system is configured to be held radially in a casing, and the transmission member is floatingly mounted in the casing, the assembly being configured in such a manner that the oil distribution system substantially conserves its alignment in the casing regardless of the axial and/or radial movements of the transmission member. The term "alignment" is used to cover both the direction and the position of its main axis. The oil distribution system is thus centered relative to the casing and not relative to the transmission member: since the parasitic axial and/or radial movements of the transmission member are decoupled from the rotary movement of the oil distribution system, the oil distribution system can remain in alignment with the portion of the casing in which it is held. With the exception of its rotary motion, the position and the orientation of the interface between the oil distribution system and the casing is thus stable over time, thereby ensuring reliability of the oil feed and durability of the oil distribution system.

In certain embodiments, the link duct is floatingly mounted between firstly contact surfaces of the oil distribution system and secondly contact surfaces of the rotary portion of the transmission member. This floating mounting enables the link duct to follow the small parasitic movements, if any, of the rotary portion of the transmission member without any loss of alignment of the link duct disturbing the alignment of the oil distribution system.

In certain embodiments, an O-ring is interposed between the link duct and said contact surfaces of the oil distribution system.

In certain embodiments, an O-ring is interposed between the link duct and said contact surfaces of the rotary portion of the transmission member. These O-rings enable damping and compensation of the relative movements between the rotary portion of the transmission member and the oil distribution system to be improved. They also serve to provide sealing between the link duct and said contact surfaces.

In certain embodiments, the oil distribution system is connected to the rotary portion of the transmission member via at least one rotary drive device including a damper. The rotary drive device provided with the damper serves to drive the oil distribution system in rotation, while limiting transmission of parasitic movements from the transmission member to the oil distribution system.

In certain embodiments, the oil distribution system is connected to the rotary portion of the transmission member via a plurality of rotary drive devices that are regularly arranged around the axis of the oil distribution system. In this way, the various rotary drive devices can co-operate in taking up equally the small parasitic variations in the axis of the rotary portion of the transmission member without transmitting them to the oil distribution system. Preferably, the rotary assembly has five rotary drive devices of this type.

In certain embodiments, the rotary drive device comprises a drive protrusion integral with or secured to the wall of one of the two elements constituted by the rotary portion of the transmission member and the oil distribution system, said protrusion being engaged in a drive opening in a wall of the other one of said elements, and a damper is interposed between said drive protrusion and said drive opening.

In certain embodiments, the drive protrusion is a screw fastened in said wall of said element.

In certain embodiments, the drive protrusion is carried by a wall of the rotary portion of the transmission member and the drive opening is formed in a wall of the oil distribution system.

In certain embodiments, the damper may deform both axially and radially.

In certain embodiments, the damper comprises an inner ring in contact with the drive protrusion, an outer ring mounted in said drive opening, and an intermediate body that is axially and radially flexible. This configuration thus serves to accommodate parasitic movements of the rotary portion of the transmission member in all directions. It also constitutes a system that is static, the relative movements being compensated by the elasticity of the damper.

In certain embodiments, the damper possesses axial symmetry.

In certain embodiments, the flexible intermediate body is made of an elastomer material, in particular out of nitrile rubber or of silicone.

In certain embodiments, the flexible intermediate body is adhesively bonded to the inner and outer rings.

In certain embodiments, the inner ring and/or the outer ring are made of metal.

In certain embodiments, the outer ring is an interference fit in the drive opening.

In other embodiments, the rotary drive device comprises a drive protrusion integral with or secured to a wall of one of the two elements constituted by the rotary portion of the transmission member and the oil distribution system, and a spacer provided around the drive protrusion, said spacer being engaged in a drive opening in a wall of the other one of said elements; a damper is provided between said drive protrusion and the spacer. The spacer serves to define accurate clearances relative to the drive opening so as to accurately adjust the axial and/or radial relative movements that are authorized between the rotary portion of the transmission member and the oil distribution system.

In certain embodiments, the damper may be an O-ring.

In certain embodiments, the drive protrusion is carried by a wall of the rotary portion of the transmission member and the drive opening is formed in a drive lug of the oil distribution system.

In certain embodiments, the rotary drive device is configured to accommodate a given axial movement of the spacer.

In certain embodiments, the rotary drive device is configured to leave axial clearance less than 1 millimeter (mm), preferably less than 0.5 mm, more preferably equal to about 0.2 mm, between the front face of the spacer and the surface of the rotary portion.

In certain embodiments, the spacer also includes a flange extending behind the drive opening, the diameter of the flange being greater than the width of the drive opening; the rotary drive device is configured so as to leave axial clearance of less than 5 mm, preferably less than 2 mm, more preferably equal to about 1 mm between the flange of the spacer and the rear face of the drive lug of the oil distribution system.

In certain embodiments, the drive device is configured so as to leave radial clearance of less than 1 mm, preferably less than 0.6 mm, more preferably equal to about 0.4 mm between the spacer and the drive protrusion.

In certain embodiments, the drive opening is an oblong opening having sides including respective rectilinear portions; the spacer has flats configured to co-operate with the rectilinear portions of the drive opening, the spacer being capable of moving axially and radially within the drive opening.

In certain embodiments, the drive device is configured to leave lateral clearance of less than 0.5 mm, preferably less than 0.2 mm, more preferably equal to about 0.12 mm between the flats of the spacer and the rectilinear portions of the drive opening.

In certain embodiments, the spacer may move within the drive opening over a length greater than 0.2 mm, preferably equal to about 0.5 mm.

In certain embodiments, the oil transfer chamber is annular and continuous over 360°.

In other embodiments, the oil transfer chamber of the oil distribution system extends over an angular sector that is strictly less than 360°. In this way, the oil transfer chamber is not continuous over a complete turn of the oil distribution system, thereby preventing oil from turning within the oil transfer system and thus limiting the impact of oil movements on the dynamic behavior of the oil distribution system as a whole. This serves to ensure that the oil remains in the same reference frame as the distribution system.

In certain embodiments, the transmission member is a speed-reduction gearbox.

In certain embodiments, the transmission member is an epicyclic gear train.

In certain embodiments, said rotary portion of the transmission member is a planet carrier.

In certain embodiments, said planet carrier possesses a plurality of spindles each carrying a planet gear, each spindle being provided with an oil reception chamber configured to lubricate the bearing of said planet carrier, and each oil reception chamber being in fluid flow connection with the oil transfer chamber of the oil distribution system via a respective link duct.

The present description also relates to a turbine engine including a rotary assembly in accordance with any of the above-described embodiments, the oil distribution system of the assembly being housed in a casing provided with an oil feed chamber.

In certain embodiments, the casing includes an annular oil outlet cavity that is open over 360° towards the oil distribution system and that is in fluid flow connection with the oil feed chamber; the oil distribution system includes an annular oil inlet cavity open over 360° facing the oil outlet cavity of the casing and in fluid flow connection with the oil transfer chamber via said at least one feed orifice. By means of this rotary assembly in which the oil distribution system remains in alignment within the casing in spite of parasitic movements of the transmission member, the annular oil inlet and outlet cavities remain in alignment facing each other in the same plane in spite of the oil distribution system rotating and in spite of the parasitic movements of the transmission member: the feed of oil to the rotary oil distribution system from the stationary casing can thus be achieved in reliable manner. Leaks of oil at the interface are also limited.

In certain embodiments, the oil inlet cavity of the oil distribution system is boxed in on either side by a sealing segment.

In other embodiments, leaks of oil at the interface between the oil distribution system and the casing maintain a film of oil. The sealing segments are dimensioned in such a manner as to ensure that the pressure of the oil enables the oil to go beyond the sealing segments in order to initiate the oil film. The oil film serves to lubricate the interface between the oil distribution system and the casing so as to ensure it rotates properly. The casing surrounding the distribution system and the transmission member preferably forms a closed enclosure enabling the oil to be recovered and preventing it from polluting or being polluted by other elements of the turbine engine.

The above-mentioned characteristics and advantages, and others, appear on reading the following detailed description of embodiments of the proposed rotary assembly. This detailed description makes reference to the accompanying drawings.

BRIEF DESCRIPTION OF THE DRAWINGS

The accompanying drawings are diagrammatic and seek above all to illustrate the principles of the invention.

In these drawings, from one figure to another, elements (or portions of an element) that are identical are identified by the same reference signs. In addition, elements (or portions of an element) belonging to embodiments that are different but that are analogous in function are identified in the figures by numerical references incremented by 100, 200, etc.

FIG. 4 is a view in perspective and in section of a portion of the first embodiment of the oil distribution system.

FIG. 5 is a perspective view of a portion of a second embodiment of the oil distribution system.

FIG. 6A is a front view of the rotary drive device of the FIG. 5 oil distribution system.

FIG. 6B is a section view of the rotary drive device of the FIG. 5 oil distribution system.

DETAILED DESCRIPTION OF EMBODIMENTS

In order to make the invention more concrete, examples of rotary assemblies are described in detail below with reference to the accompanying drawings. It should be recalled that the invention is not limited to these embodiments.

Figure 1:
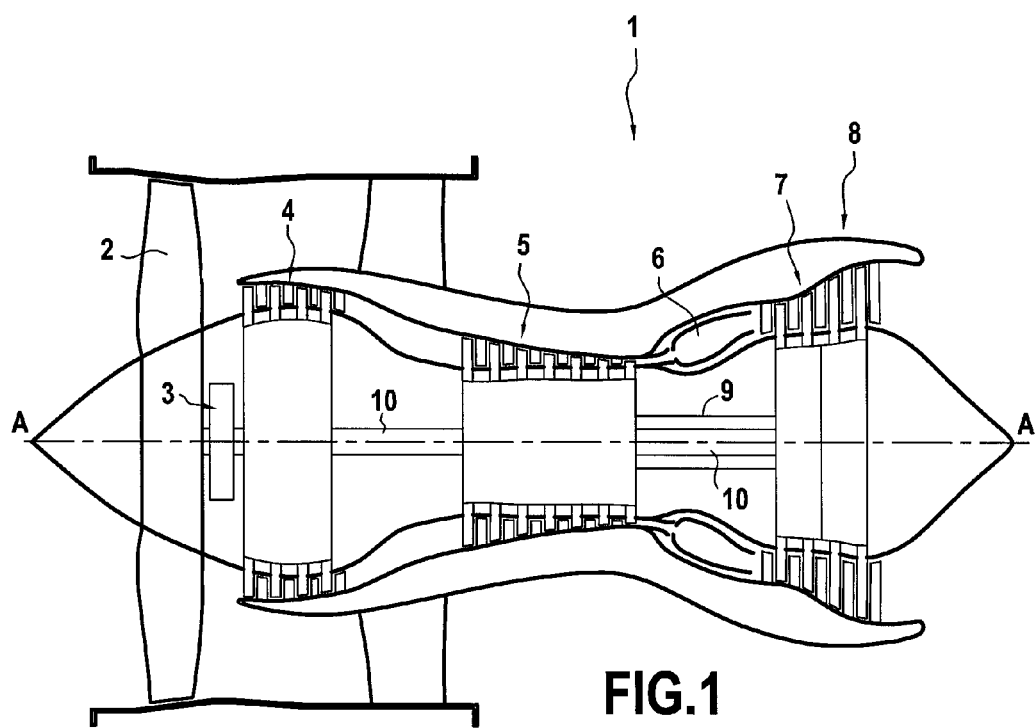
FIG. 1 is an axial section view of an example of a turbine engine with a gearbox.

FIG. 1 is a section view of a bypass turbojet 1 with a gearbox of the invention shown in a vertical plane containing its main axis A. Going from upstream to downstream, the jet comprises a fan 2, a gearbox 3, a low pressure compressor 4, a high pressure compressor 5, a combustion chamber 6, a high pressure turbine 7, and a low pressure turbine 8.

In such a turbojet 1 with a gearbox, the high pressure turbine 7 drives the high pressure compressor 5 via a high pressure shaft 9. The low pressure turbine 8, also referred to as a fast turbine, drives the low pressure compressor 4, also referred to as a fast compressor, via low pressure shaft 10. The fast turbine 8 also drives the fan 2 via the speed-reduction gearbox 3. In this way, the fan 2 may be driven at a slow speed, which is favorable from an aerodynamic point of view, while the low pressure compressor 4 may be driven at a faster speed, which is favorable from a thermodynamic point of view.

Figure 2:
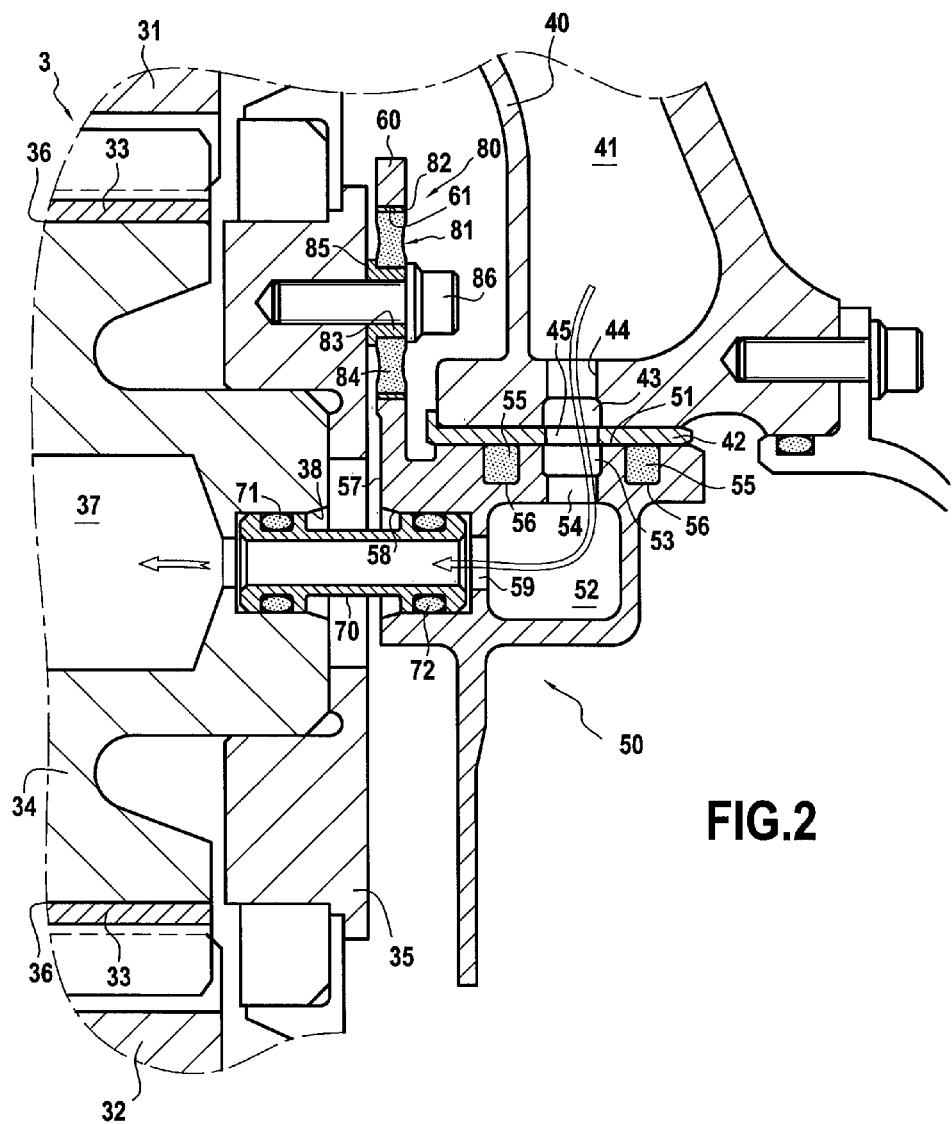
FIG. 2 is a fragmentary section view of a first embodiment of an oil distribution system and its environment.

The gearbox 3 is shown in part in FIG. 2: it comprises an epicyclic gear train having an outer ring 31, a sun gear 32, and planet gears 33. The planet gears 33 are mounted to rotate on spindles 34 of a planet carrier 35. The bearings 36 between the planet gears 33 and their respective spindles 34 may be smooth as in this example, or they may include rolling mechanisms, e.g. having rollers. In this example, the planet carrier 35 drives the fan 2 while the sun gear is driven by the low pressure shaft 10.

The gearbox 3 is floatingly mounted in a casing 40: in particular because of the vibration to which the gearbox 3 is subjected, it can move within the casing 40 by several millimeters axially or radially relative to its nominal position. Because of these parasitic movements, the axis of the gearbox 3 may likewise depart by several degrees from its nominal alignment axis in the casing 40.

In order to limit the friction of the planet gears 33 on their spindles 34, the bearings 36 need to be lubricated: oil lubrication is therefore provided. This flow of oil also serves to cool the bearings 36. In order to enable this lubrication, the spindles 34 of the planet gears 33 include respective oil reception chambers 37 in fluid flow connection with the bearing 36 via channels (not shown) passing through the spindle 34. The casing 40 has an oil feed chamber 41. Oil is transferred from the oil feed chamber 41 of the casing 40 to the various oil reception chambers 37 of the spindles 34 of the planet carriers 35 by means of an oil distribution system 50.

Figure 3A:
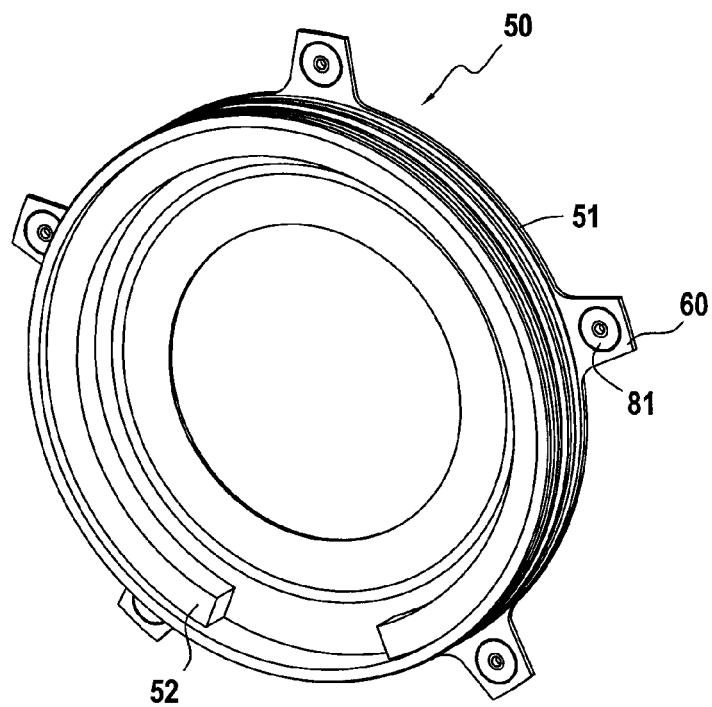
FIGS. 3A and 3B are perspective views as seen from in front and from behind of a first embodiment of an oil distribution system.
Figure 3B:
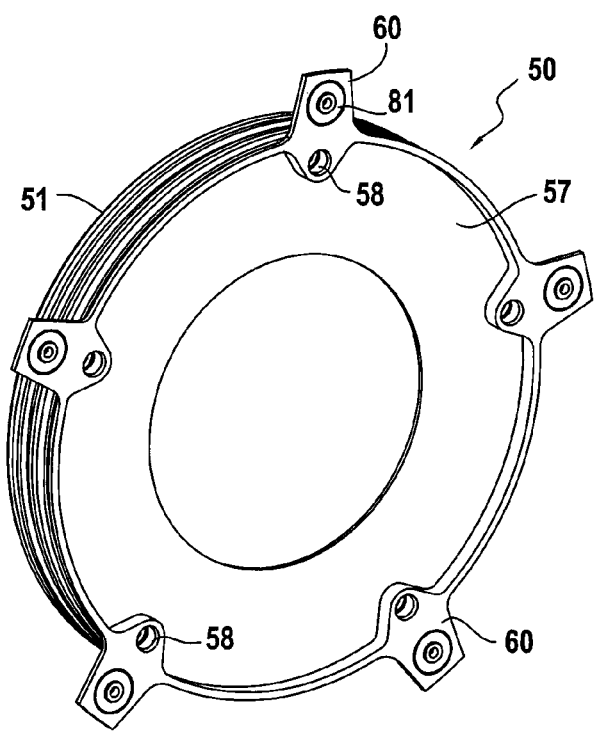

This oil distribution system 50, which can be seen more clearly in FIGS. 3A, 3B, and 4, is a generally annular part having a cylindrical outer wall 51 and an oil transfer chamber 52 extending in a circular arc inside and along practically all of the outer wall 51. In this embodiment, the epicyclic gear train has five planet gears 33: it is therefore advantageous for the oil transfer chamber to extend over a little more than four-fifths of a complete turn in order to be capable of feeding the five spindles 34 of the planet carriers 35.

The oil distribution system 50 is mounted in the casing 40 by engaging its cylindrical outer wall 51 in a cylindrical band 42 of the casing 40.

In order to transfer oil from the oil feed chamber 41 to the oil transfer chamber 52, the casing 40 includes, on the back of the band 42, an annular oil outlet cavity 43 extending over 360° along the band 42 and in fluid flow connection with the oil feed chamber 41 via an orifice 44.

The oil distribution system 50 has an annular oil inlet cavity 53 that is open over 360° in the cylindrical outer wall 51 and that is in fluid flow connection with the oil transfer chamber 52 via feed orifices 54.

These annular oil outlet and inlet cavities 43 and 53 are arranged in such a manner as to face each other when the oil distribution system 50 is mounted in the casing 40, the band 42 being provided with through orifices 45 in the oil outlet cavity 43. In this example, the band 42 is provided with at least ten through orifices 45. The oil distribution system 50 also has two annular sealing gaskets 55 arranged in annular grooves 66 formed in the cylindrical outer wall 51 on either side of the annular oil inlet cavity 53. The sealing gaskets 55 are dimensioned in such a manner that a small oil leakage flow rate remains possible so as to maintain a film of oil at the interface between the oil distribution system and the casing 40. The casing surrounding the distribution system and the transmission member form a closed enclosure enabling oil to be recovered and preventing oil from polluting or being polluted by other elements of the turbine engine.

In order to transfer oil from the transfer chamber 52 to the oil reception chambers 37 of the spindles 34, the front wall 57 of the oil distribution system 50 has reinforcement 58 provided at the locations facing the spindles 34 of the planet carrier 35: in this example, the oil distribution system 50 thus has reinforcement 58 in five regularly spaced-apart locations. The reinforcement 58 in each location is in fluid flow communication with the oil transfer chamber 52 via orifices 59.

Each spindle 34 of the planet carrier 35 has reinforcement 38 in fluid flow communication with the oil reception chamber 37.

For each spindle 34, a link duct 70 is floatingly mounted firstly between the side walls of the reinforcement 38 of the spindle 34, and secondly between the side walls of the reinforcement 58 of the facing oil distribution system 50, thereby enabling the oil reception chamber 37 of the spindle 34 to be in fluid flow connection with the oil distribution chamber 52. The link duct 70 also has front and rear O-rings 71 and 72 providing sealing between the link duct 70 and the respective side walls of the reinforcement 38 and 58. The O-rings also provide a certain amount of damping and create annular linear connections for absorbing radial and angular dispersions between the oil distribution system and the oil reception chamber.

Thus, while feeding oil, oil leaves the oil feed chamber 41 of the casing 40 in order to fill the annular outlet cavity 43 via the orifice 44; oil then pours into the entire annular outlet cavity 43 and passes through the passages 45 in the band in order to fill in turn the inlet cavity 53 of the oil distribution system 50, and then enter into the oil transfer chamber 52 via the admission orifices 54; the oil can then be distributed via the link ducts 70 to the oil reception chambers 37 of the spindles 34 from which it is conveyed to the bearings 36.

In order to enable the oil distribution system 50 to rotate together with the planet carriers 35 of the gearbox 3 while limiting stresses exerted on the link duct 70, the rotary assembly constituted by the gearbox 3 and its oil distribution system 50 further includes a rotary drive device 80. As in the present example, the rotary assembly preferably has as many rotary drive devices 80 as there are spindles 34, each rotary drive device 80 being located in the proximity of a link duct 70.

More precisely, the oil distribution system 50 has drive lugs 60 extending radially outwards from the front wall 57 of the oil distribution system 50 in register with the reinforcement 58. Each drive lug 60 is pierced by a circular drive opening 61 in which the rotary drive device 80 is engaged.

In this example, the rotary drive devices 80 are situated in the proximity of the link ducts 70 and on the same diameters as the link ducts. Nevertheless, depending on the case of the oil distribution system, other configurations are possible. In particular, it could equally well be advantageous for each rotary drive device to be located between two planets. They could also be closer to the center of the oil distribution system in order to reduce the overall size of the system.

The rotary drive device 80 includes a damper 81 comprising an outer metal ring 82, an inner metal ring 83, and a flexible intermediate body 84 made of silicone that is adhesively bonded between the outer and inner rings 82 and 83. The damper 81 is an interference fit within the drive opening 61 via its outer ring 82. The inner ring 83 has a radially-extending flange 85 on its front face. A drive screw 86 is engaged within the inner ring 83 and is fastened in the planet carrier 35 in such a manner as to press the radial flange 85 of the inner ring 83 against the surface of the planet carrier 35.

By means of this rotary drive device 80, rotation of the planet carrier 35 drives the oil distribution system 50 in rotation. Nevertheless, the axial and radial movements of the gearbox 3 are damped by means of the flexible intermediate body 84 of the damper 81 and are therefore not transmitted to the oil distribution system 50: except for its movement in rotation, the position of the oil distribution system 50 relative to the casing 40 is therefore unchanging. In addition, because of the plurality of rotary drive devices 80 that are distributed around the oil distribution system 50, losses of alignment of the gearbox 3 are likewise not transmitted to the oil distribution system 50.

FIGS. 5, 6A, and 6B show a second embodiment of the oil distribution system 150 that is entirely analogous to the first embodiment but that is fitted with a rotary drive device 180 that is different.

In this embodiment, the oil distribution system 150 likewise has drive lugs 160, each drive lug 160 being pierced by a drive opening 161; nevertheless, in this embodiment, the drive opening 161 is not circular but is oblong, each of its sides including a rectilinear portion 162.

The drive device 180 includes a spacer 187 with side flats 188 that are configured to co-operate with the rectilinear portions 162 of the drive orifice 161, and a rear radial flange 189 that is configured to co-operate with the rear surface of the drive lug 160.

The spacer 187 also has a central bore 190 in which there is engaged a drive screw 186 that is fastened in the planet carrier 135. An O-ring 191, acting as a damper, is also arranged between the drive screw 186 and the bore 190 in the spacer 187.

This rotary drive device 180 is configured so as to leave a certain amount of clearance between the various parts. Thus, as shown in FIG. 6B, when the radial flange 189 of the spacer 187 is pressed against the shoulder 186a of the drive screw 186 and when the drive lug 160 is pressed against the planet carrier 135, first clearance J1 of about 0.2 mm is left between the front face of the spacer 187 and the surface of the planet carrier 135; furthermore second clearance J2 of about 1 mm is left between the radial flange 189 of the spacer 187 and the rear surface of the drive lug 160.

As shown in FIG. 6A, third clearance J3 of about 0.4 mm is left between the drive screw 186 and the central bore 190 of the spacer 187; this third clearance J3 is filled in by the O-ring 191. Fourth clearance J4 of about 0.12 mm is left between the flats 188 of the spacer 187 and the rectilinear portions 162 of the drive opening 161. Finally, the spacer 187 is free to move radially along the oblong drive opening 161 over a length J5 of about 0.5 mm, as a function of dispersion in the operation of the gearbox.

Thus, by means of this rotary drive device 180, rotation of the planet carrier 135 drives the oil distribution system 150 in rotation. Nevertheless, these clearances J1 to J5 and the damper 191, ensure that axial or radial movements of the gearbox 3 are not transmitted to the oil distribution system 150. In addition, because of the plurality of rotary drive devices 180 that are distributed around the oil distribution system 150, losses of alignment of the gearbox 3 are likewise not transmitted to the oil distribution system 150.

The embodiments or implementations described in the present description are given by way of non-limiting illustration, and in the light of this description a person skilled in the art can easily modify these embodiments or implementations or can envisage others, while remaining within the ambit of the invention.

Furthermore, the various characteristics of these embodiments or implementations can be used singly or they may be combined within one another. When they are combined, these characteristics may be combined as described above or in other ways, the invention not being limited to the specific combinations described in the present description. In particular, unless specified to the contrary, a characteristic described with reference to any one embodiment or implementation may be applied in analogous manner to some other embodiment or implementation.

The invention claimed is:

1. A rotary assembly comprising a transmission member and an oil distribution system, wherein
   the oil distribution system comprises at least one oil transfer chamber provided with at least one feed orifice configured to receive oil from outside the rotary assembly;
   the transmission member includes at least one rotary portion provided with at least one oil reception chamber;
   at least one link duct provides fluid flow connection between the oil transfer chamber and the oil reception chamber;
   wherein the oil distribution system is driven by said rotary portion of the transmission member to rotate together with it;
   wherein the rotary assembly is configured in such a manner as to accommodate a given amount of axial and/or radial relative movement between said rotary portion of the transmission member and the oil distribution system; and
   wherein the oil transfer chamber of the oil distribution system extends over an angular sector that is strictly less than 360°.

2. An assembly according to claim 1, wherein the oil distribution system is configured to be held radially in a casing, and wherein the transmission member is floatingly mounted in the casing, the assembly being configured in such a manner that the oil distribution system substantially conserves its alignment in the casing regardless of the axial and/or radial movements of the transmission member.

3. An assembly according to claim 1, wherein the link duct is floatingly mounted between firstly contact surfaces of the oil distribution system, and secondly contact surfaces of the rotary portion of the transmission member, O-rings being preferably interposed between the link duct and said contact surfaces of the oil distribution system and the rotary portion of the transmission member.

4. An assembly according to claim 1, wherein the oil distribution system is connected to the rotary portion of the transmission member via at least one rotary drive device including a damper.

5. An assembly according to claim 4, wherein the rotary drive device comprises a drive protrusion integral with or secured to the wall of one of the two elements constituted by the rotary portion of the transmission member and the oil distribution system, said protrusion being engaged in a drive opening in a wall of the other one of said elements, and
   wherein a damper is interposed between said drive protrusion and said drive opening.

6. An assembly according to claim 5, wherein the damper comprises a metal inner ring in contact with the drive protrusion, a metal outer ring mounted in said drive opening, and an axially and radially flexible intermediate body.

7. An assembly according to claim 4, wherein the rotary drive device comprises a drive protrusion integral with or secured to a wall of one of the two elements constituted by the rotary portion of the transmission member and the oil distribution system, and a spacer provided around the drive protrusion, said spacer being engaged in a drive opening in a wall of the other one of said elements, and
   wherein a damper is provided between said drive protrusion and the spacer, the damper preferably being an O-ring.

8. An assembly according to claim 7, wherein the drive opening is an oblong opening having sides including respective rectilinear portions, and wherein the spacer has flats configured to co-operate with the rectilinear portions of the drive opening, the spacer being capable of moving axially and radially within the drive opening.

9. An assembly according to claim 1, wherein the transmission member is a speed reducing gearbox of the epicyclic gear train type, wherein said rotary portion of the transmission member is a planet carrier, and wherein said planet carrier possesses a plurality of spindles each carrying a planet gear, each spindle being provided with an oil reception chamber configured to lubricate the bearing of said planet carrier, and each oil reception chamber being in fluid flow connection with the oil transfer chamber of the oil distribution system via a respective link duct.

10. A gearbox assembly comprising a rotary assembly according to claim 1, oil distribution system of the assembly being received in a casing having an oil feed chamber;
- wherein the casing includes an annular oil outlet cavity open over 360° towards the oil distribution system and in fluid flow connection with the oil feed chamber; and
- wherein the oil distribution system comprises an annular oil inlet cavity open over 360° facing the oil outlet cavity of the casing and in fluid flow connection with the annular oil outlet cavity, and via said at least one feed orifice with the oil transfer chamber.

11. A turbine engine including a rotary assembly according to claim 1.

12. A turbine engine including a gearbox assembly according to claim 10.

* * * * *